(12) United States Patent
Ali et al.

(10) Patent No.: US 6,353,927 B1
(45) Date of Patent: Mar. 5, 2002

(54) DATA DOWNLOAD TECHNIQUE INTO INSTALLED MEMORY

(75) Inventors: Syred S. Ali, Allentown; Steven C. Szep, Orefield; Richard M. Ubowski, Harleysville, all of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/119,232

(22) Filed: Jul. 21, 1998

Related U.S. Application Data

(60) Provisional application No. 60/062,096, filed on Oct. 14, 1997.

(51) Int. Cl.[7] .............................................. G06F 9/445
(52) U.S. Cl. ................................ 717/11; 717/1; 710/23
(58) Field of Search ........................... 395/712; 717/11, 717/1; 710/23; 714/14

(56) References Cited

U.S. PATENT DOCUMENTS

| | | | | |
|---|---|---|---|---|
| 4,042,914 A | * | 8/1977 | Curley et al. .................. 710/23 |
| 4,361,877 A | * | 11/1982 | Dyer et al. ................... 702/176 |
| 4,811,287 A | * | 3/1989 | Kupersmith et al. ........... 365/52 |
| 5,142,680 A | * | 8/1992 | Ottman et al. ................. 717/11 |
| 5,247,683 A | * | 9/1993 | Holmes et al. .............. 709/221 |
| 5,260,697 A | * | 11/1993 | Barrett et al. ................ 345/173 |
| 5,263,003 A | * | 11/1993 | Cowles et al. ........... 365/230.03 |
| 5,321,840 A | * | 6/1994 | Ahlin et al. ................... 717/11 |
| 5,325,463 A | * | 6/1994 | Murata et al. ............... 704/266 |
| 5,394,536 A | * | 2/1995 | Coghlan et al. .............. 714/14 |
| 5,548,728 A | * | 8/1996 | Danknick |
| 5,606,660 A | * | 2/1997 | Estakhri et al. ................ 714/38 |
| 5,613,089 A | * | 3/1997 | Hornbuckle ................. 711/164 |
| 5,625,780 A | * | 4/1997 | Hsieh et al. .................. 710/131 |
| 5,680,579 A | * | 10/1997 | Young et al. ................ 395/484 |
| 5,701,411 A | * | 12/1997 | Tran et al. ................... 709/250 |
| 5,717,930 A | * | 2/1998 | Imai et al. ..................... 717/11 |
| 5,754,795 A | * | 5/1998 | Kuhlman et al. ........... 709/236 |
| 5,794,061 A | * | 8/1998 | Hansen et al. .................. 712/1 |
| 5,815,706 A | * | 9/1998 | Stewart et al. ................. 713/2 |
| 5,859,628 A | * | 1/1999 | Ross et al. ................... 345/173 |
| 5,887,164 A | * | 3/1999 | Gupta ............................ 713/2 |
| 5,898,884 A | * | 4/1999 | Tsukamoto ................. 711/103 |
| 6,011,741 A | * | 1/2000 | Wallace et al. ............. 365/221 |
| 6,038,399 A | * | 3/2000 | Fisher et al. ................... 717/11 |
| 6,104,875 A | * | 8/2000 | Gallagher et al. ............. 717/11 |
| 6,137,476 A1 | * | 10/2001 | Hocker et al. .............. 345/163 |

OTHER PUBLICATIONS

Title: Memory Upgrade, O Navy News & Undersea Technology, (Dec. 16, 1991).*
Title: Erasable/programmable solid–state memories, AU Cormier D, SO EDN (Nov. 14, 1985).*

* cited by examiner

Primary Examiner—Mark R. Powell
Assistant Examiner—Chameli C. Das
(74) Attorney, Agent, or Firm—William H. Bollman

(57) ABSTRACT

The present invention provides a method and apparatus for programming installed memory integrated circuits. A temporary connection is made between an external processor and a printed circuit board containing one or more installed memory integrated circuits and an on-board processor. At a suitable time, e.g., when the on-board processor is idle, the external processor takes control of the on-board processor and accesses the memory integrated circuits via temporary connections. In the disclosed embodiment, the control is caused by a held reset signal from the external processor to the on-board processor, which causes control signals from the on-board processor to the memory integrated circuit to enter a tri-state condition. Data is downloaded from the external processor to the memory integrated circuit while the external processor maintains control of the on-board processor. The invention allows downloading of data (or programming) to a memory device while it remains installed in an application printed circuit board.

21 Claims, 3 Drawing Sheets

DATA DOWNLOAD TECHNIQUE INTO INSTALLED MEMORY

This application claims priority from U.S. Provisional Application No. 60/062,096, entitled "Data Downloading Technique" filed Oct. 14, 1997.

BACKGROUND OF THE INVENTION

1. Field of the Invention

This application relates generally to a data download technique to download data into memory in an assembled printed circuit board. More particularly, it is particularly applicable to the downloading of voice prompt data into memory (e.g., Flash memory) in an assembled printed circuit board of a digital telephone answering device.

2. Background of Related Art

Conventionally, in digital voice messaging systems such as a digital telephone answering device (TAD), voice prompt data is programmed into a memory integrated circuit before installation in the TAD, then permanently soldered in place in the TAD.

FIG. 3 depicts a conventional programmer for programming a memory to contain certain predetermined data.

In particular, a fresh memory integrated circuit 204, e.g., serial or parallel flash memory, is physically inserted into a socket 302 of a programmer 300, and then a manufacturing operator instructs the programmer 300 to store the appropriate information in the memory integrated circuit 204. Thereafter, the memory integrated circuit 204 is removed from the socket 302 of the programmer 300, and inventoried as a separate part from that of the unprogrammed integrated circuit 204.

From the perspective of the external package, a unprogrammed memory integrated circuit 204 looks the same as a programmed memory integrated circuit 204. Thus, care must be taken on the manufacturing floor in identifying and managing the programmed and unprogrammed memory integrated circuits 204. The TAD device will likely be rejected at a later stage of the manufacturing process if an unprogrammed memory integrated circuit 204 were to be installed rather than the desired programmed memory integrated circuit 204.

As revisions to the data being programmed into the memory integrated circuit 204 occur, as is frequently the case in the world of software, the later revisions of the programmed memory integrated circuits 204 are usually inventoried differently from earlier revisions of the programmed integrated circuits 204, and typically marked as having been programmed with a particular version of data. Moreover, inventory problems are exacerbated when more than one memory integrated circuit 204 is required in the TAD.

After programming, the memory integrated circuit 204 is soldered into a printed circuit board (PCB) of the TAD. Typically, this soldering process must be performed by hand, e.g., to reduce the possibility that the high temperatures of automated soldering techniques would alter the information stored in the memory.

The conventional programming technique and secondary soldering the programmed integrated circuits 204 onto a printed circuit board cause bottlenecks in the manufacturing process. Moreover, the creation of multiple revisions of data and/or multiple circuits in a chip set can cause additional administration overhead in the manufacturing floor. Furthermore, device yield may suffer as a result of the possibility that unprogrammed memory integrated circuits may erroneously be installed on the printed circuit board.

Accordingly, there is a need for an improved method of programming a memory integrated circuit with, e.g., voice prompt information, which allows a smooth manufacturing flow and which allows for an increased device yield.

SUMMARY OF THE INVENTION

It is an aspect of the invention to provide a method of downloading data to an installed component on a printed circuit board. The method includes temporarily electrically coupling to an external processor a printed circuit board including an installed on-board processor and an installed memory. The status of the on-board processor is monitored from the external processor. A signal is activated from the external processor to control the on-board processor, and data is downloaded from the external processor to the memory on the printed circuit board while the external processor controls a status of the on-board processor.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a technique for downloading data, e.g., voice prompt (or speech) data, from a temporarily connected external source (e.g., an external processor), into one or more memory integrated circuits installed on a printed circuit board. The disclosed embodiment relates to a voice messaging system in general and a telephone answering device (TAD) in particular.

Figure 1:
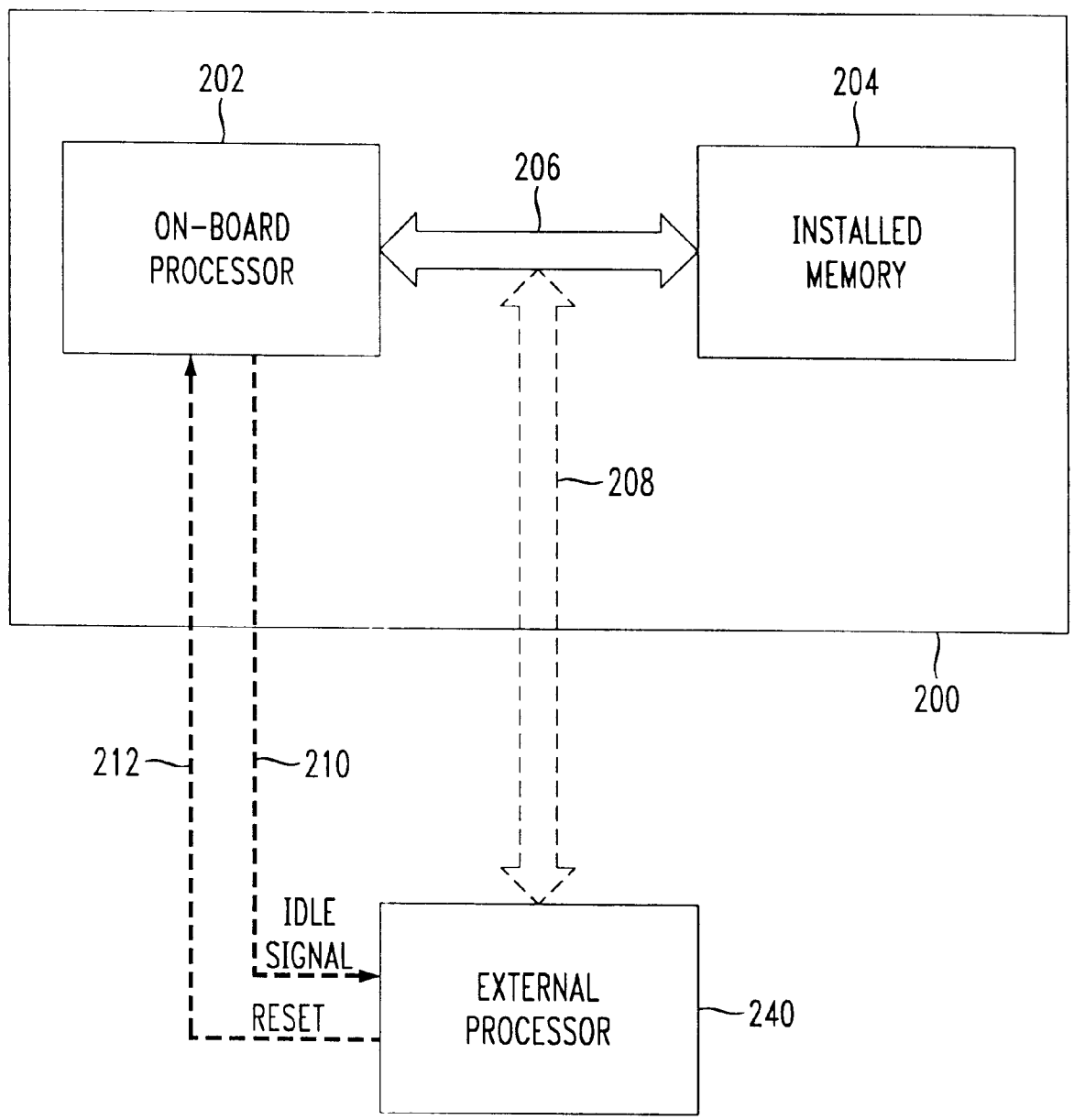
FIG. 1 depicts the temporary connection of an external processor which takes control of and programs permanently installed memory.

FIG. 1 depicts a memory integrated circuit 204 installed in a printed circuit board 200. An on-board processor 202, also installed on the printed circuit board 200, controls signals 206 to the memory integrated circuit 204.

The present invention provides a temporary connection to and control of the installed on-board processor 202 from an external processor 240.

In particular, the external processor 240 is temporarily connected to appropriate portions of the printed circuit 200 containing electrical contacts to the control bus 206 to the memory integrated circuit 204. In the disclosed embodiment, any necessary buffering to the control bus 206 is included in the external processor 240. However, buffering may not be necessary depending upon the application.

Preferably, additional circuitry is not necessary or added to the PCB 200 to accommodate the temporary connection of the external processor 240. Otherwise, the benefits gained by downloading data from the external processor 240 to the installed memory integrated circuit 204 may be outweighed by the additional cost, labor and reduced reliability caused by the additional components. However, a printed circuit board with additional circuitry to accommodate an external processor is within the scope of the present invention.

The temporary connection between the external processor 240 and the on-board processor 202 would be expected to otherwise conflict with the control signals 206 from the on-board processor 202 when the PCB 200 is powered up. However, in accordance with the principles of the present invention, the external processor 240 monitors a status of the on-board processor 202 and assumes control of the control bus 206 to the memory integrated circuit 204 only at an appropriate time.

The external processor 240 has both the capability of monitoring a general status of the on-board processor 202 in a powered up state, and of capturing control of the control bus 206 to the memory integrated circuit 204. Thus, in the disclosed embodiment, the external processor 240 has the capability of detecting when the on-board processor 202 enters an idle state, and of holding the on-board processor 202 in a reset condition.

To detect when the on-board processor 202 enters the idle state, the external processor 240 monitors the level of an idle signal 210 from the on-board processor 202 through any appropriate I/O register. The idle signal 210 may be activated by the on-board processor 202 at any appropriate time determined by the application. For instance, in the case of a TAD, the on-board processor may initialize the installed memory integrated circuit 204, then toggle an appropriate bit of an output register used to form the idle signal 210.

Upon detection of the idle status of the on-board processor 202, indicating in the disclosed embodiment that the on-board processor 202 has completed its generic initialization of the installed memory 204, the external processor 240 takes control of the control signals 206. For instance, in the disclosed embodiment, the external processor 240 activates a reset signal to the on-board processor 202. Activation of the reset input to the on-board processor 202 causes the on-board processor 202 to relinquish control of the control signals 206 to the installed memory integrated circuit 204, e.g., by tri-stating the control signals 206. Preferably, the on-board processor 202 is held in a reset condition until the external processor 240 completes its tasks, creating an opportunity for the external processor 240 to operate the control signals 206 via a temporary connection to the control signals 208.

The temporary connection to the control signals may be made using a bed of nails which contacts an electrical point such as a via hole on each of the necessary control signals 206. Alternatively, the external processor may include a test clip which contacts points on a suitable integrated circuit, e.g., the on-board processor 202.

The installed memory integrated circuit 204 may include one or more physical ICs, and may be of the serial or parallel type. Moreover, the memory may be any non-volatile memory, e.g., flash memory. The present invention is particularly suited to using memory which is soldered into a printed circuit board, and even more so with an on-board processor which is soldered to the printed circuit board.

An embodiment of a process for downloading data after the manufacture of the telephonic device in accordance with the present invention is now described with reference to FIG. 2.

In particular, in step 101, an installed on-board processor 202 and installed memory integrated circuits 204 are populated (i.e., inserted and soldered) on a printed circuit board 200, e.g., as shown in FIG. 1. Although it is preferred that the printed circuit board 200 be fully populated such that it is fully functional, the present invention relates equally to the population of only the on-board processor 202, memory integrated circuit 204, and any components necessary for basic operation of the memory integrated circuit 204 from an external processor 240.

Figure 2:
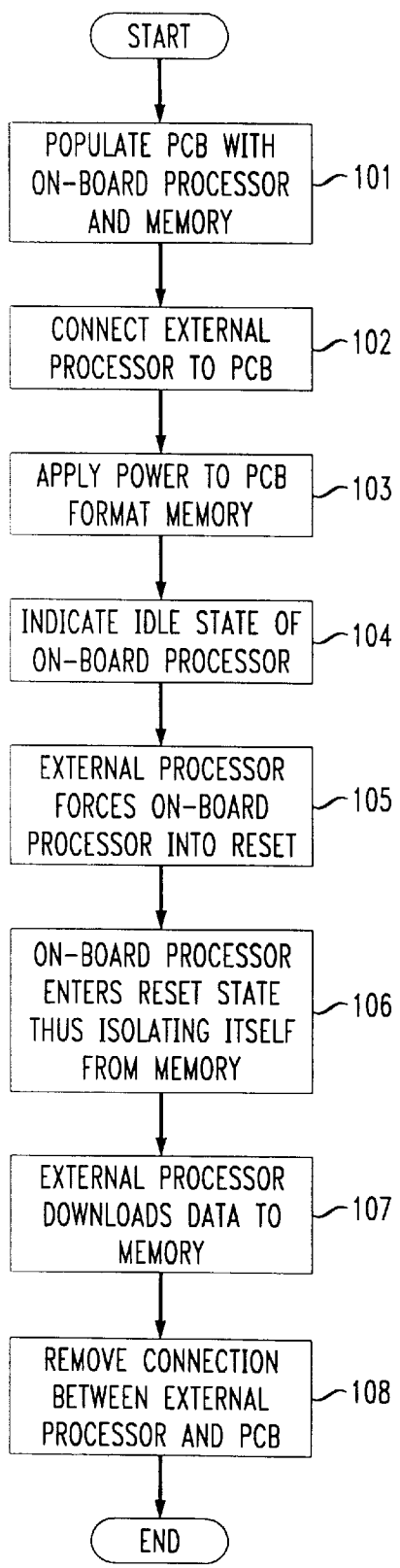
FIG. 2 is a flow chart showing the process of programming an installed memory in accordance with the principles of the present invention.
Figure 3:
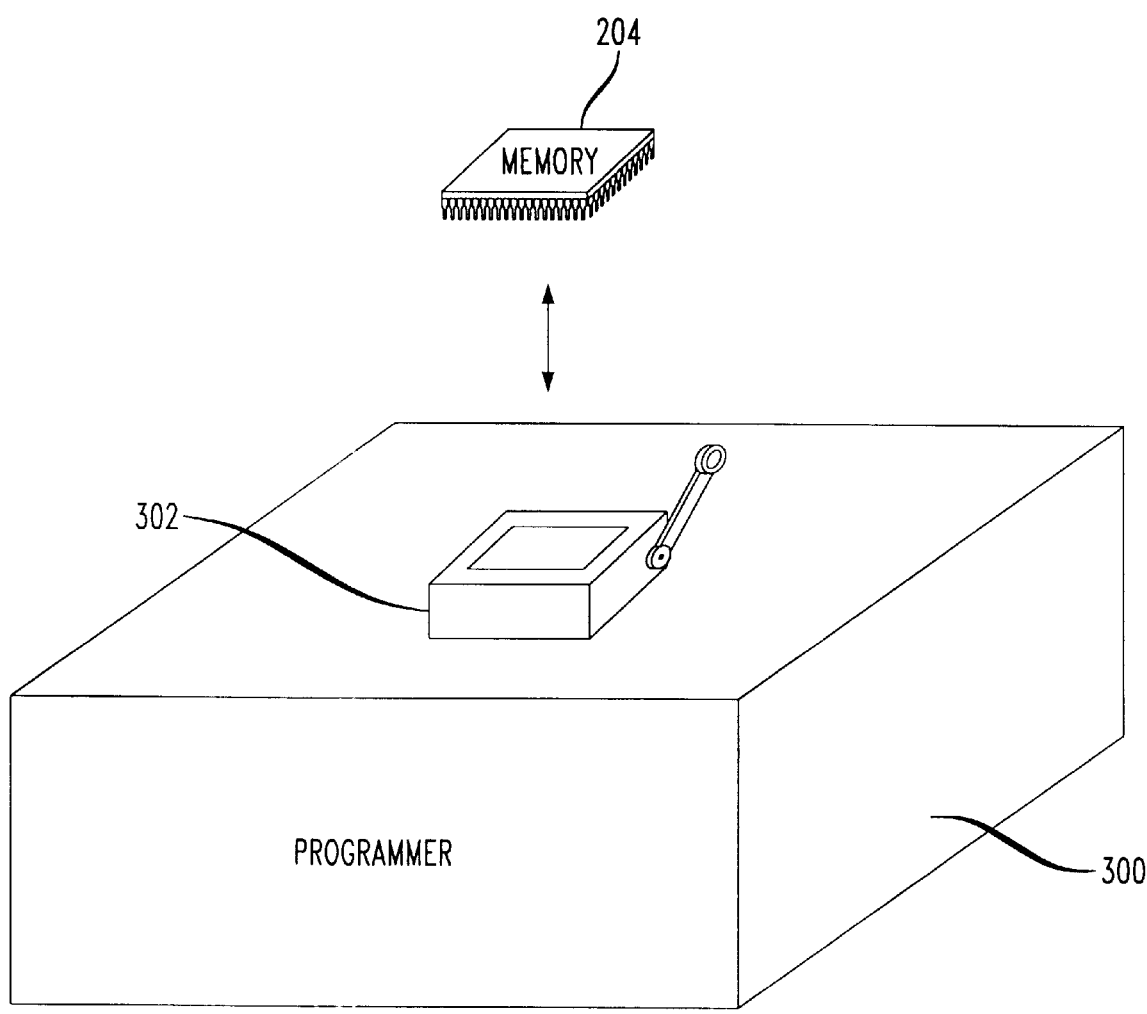
FIG. 3 depicts a conventional memory integrated circuit being programmed by a programmer.

In step 102 of FIG. 2, the external processor 240 is brought into contact with the control signals 206 of the printed circuit board 200. Preferably, a point contact system such as a bed of nails tester is utilized to connect the external processor to the printed circuit board 200. However, the present invention is equally applicable to a temporary connection of the external processor to the printed circuit board 200 using any suitable connection, e.g., a socket formed on the printed circuit board 200. However, a point contact system is preferred to reduce or eliminate the need for additional components.

In step 103, once the external processor 240 is placed in temporary contact with the printed circuit board 200 in step 102, power is applied to the board and the on-board processor 202 takes control of the system by, e.g., formatting the memory integrated circuit 204. Alternatively, after power up, the external processor 240 may take immediate control of the system in accordance with the principles of the present invention and itself format the memory integrated circuit 204. In any event, format information is stored in a sector of the memory integrated circuit 204 in the disclosed embodiment utilizing Flash memory. The format information is located at a later time by either the on-board processor 202 or the external processor 240 by scanning the memory integrated circuit 204 for a sector containing a specific header.

In step 104, after formatting the installed memory integrated circuit 204 and/or configuring other system parameters, the on-board processor 202 indicates to the external processor 240 a suitable time for the external processor 240 to assume control of the control signals 206 to the installed memory integrated circuit 204. For example, in the disclosed embodiment the on-board processor 202 toggles a predetermined idle signal 210 to the external processor 240 to indicate that the on-board processor 202 has reached an idle state.

In step 105, the external processor 240 monitors the idle state signal 210 from the on-board processor 202. Once the external processor 240 determines that the on-board processor 202 has entered an idle or otherwise suitable state, the external processor 240 takes control of the on-board processor 202 and control signals 206 to the memory integrated circuit 204. For instance, in the disclosed embodiment, the external processor 240 takes control by activating a reset signal 212 to a reset pin of the on-board processor 202.

In step 106, in response to the activation of a reset signal by the external processor 240, the on-board processor 202 enters into a reset state. In the reset state, the on-board processor 202 isolates itself from the control signals 206 to the installed memory integrated circuit 204, e.g., by tri-stating output buffers.

In step 107, the external processor 240 takes control of the installed memory integrated circuit 204 and passes control signals 206 over a temporarily connected extension bus 208. The external processor 240 in the disclosed embodiment then scans the memory integrated circuit 204 for identifying information, e.g., for a format table. The external processor 240 then downloads data, e.g., voice prompt data, over the temporarily connected extension bus 208 to the memory integrated circuit 204.

Once control is assumed by the external processor 240, any type of data may be written or erased from the installed memory integrated circuit 204. For instance, in the disclosed embodiment, if voice prompts have been loaded previously into the memory integrated circuit 204, they may be erased and/or overwritten in steps 103 to 107 of the process shown in FIG. 2.

The present invention further relates to a technique for upgrading software in an installed memory integrated circuit. For instance, data stored in the installed memory integrated circuit after it is returned from the field may be overwritten or appended without the need to unsolder or otherwise remove the memory integrated circuit 204 from the printed circuit board 200.

In step 108, once the data is downloaded to the installed memory integrated circuit 204, the temporary connection of the external processor 240 to the printed circuit board 200 is removed.

Steps 101 to 108 may be repeatedly cycled for each printed circuit board 200 in a manufacturing process.

The present invention is particularly applicable to high volume manufacturing or upgrading of systems, e.g., digital telephone answering devices, to reduce the time required to manufacture each device.

Moreover, the present invention allows a manufacturer the ability to assemble the printed circuit boards of consumer devices with unprogrammed memory ICs, which can be programmed post manufacture by a temporarily connected external processor.

The present invention also allows the manufacture of hardware platforms with permanently installed memory before the software is complete. For instance, it is often the case that the hardware design is completed before software is developed. The present invention allows the cost savings of socketless memory installation before the software is complete. Moreover, additional features either in the device purchased and/or in the telephone system's central office may occur after the manufacture of the consumer device. The present invention simplifies the upgrading process of printed circuit boards by allowing installed memory to remain installed while it is being upgraded.

While the present invention is described with respect to a memory integrated circuit for a telephone answering device, the principles of the present invention are equally applicable to the post-installation programming of virtually any type of memory into any type of device. Moreover, although the memory described in the present embodiments was programmed with voice prompt data, the present invention is equally applicable to the programming of any type of data into installed memory.

While the invention has been described with reference to the exemplary embodiments thereof, those skilled in the art will be able to make various modifications to the described embodiments of the invention without departing from the true spirit and scope of the invention.

What is claimed is:

1. A method of downloading data to an installed component on a printed circuit board during manufacturing, comprising:
   temporarily electrically coupling to an external processor during manufacturing a printed circuit board including an installed on-board processor and installed solid state memory;
   activating a signal from said external processor to control said on-board processor; and
   while said external processor controls operation of said on-board processor, downloading data from said external processor to adjust software in said solid state memory on said printed circuit board.

2. The method of downloading data to an installed component on a printed circuit board during manufacturing according to claim 1, wherein:
   said signal is activated from said external processor based on a determination that said on-board processor has entered a passive state.

3. The method of downloading data to an installed component on a printed circuit board during manufacturing according to claim 2, wherein:
   said passive state of said on-board processor is an idle state.

4. The method of downloading data to an installed component on a printed circuit board during manufacturing according to claim 2, further comprising, after said step of coupling said signal from said external processor:
   holding said on-board processor in said passive date.

5. The method of downloading data to an installed component on a printed circuit board during manufacturing according to claim 1, further comprising:
   monitoring, from said external processor, a status of said on-board processor.

6. The method of downloading data to an installed component on a printed circuit board during manufacturing according to claim 1, further comprising:
   decoupling said external processor from said printed circuit board.

7. The method of downloading data to an installed component on a printed circuit board during manufacturing according to claim 1, wherein:
   said solid state memory is a Flash memory.

8. The method of downloading data to an installed component on a printed circuit board during manufacturing according to claim 1, wherein:
   said coupled signal is a reset signal.

9. The method of downloading data to an installed component on a printed circuit board during manufacturing according to claim 1, further comprising:
   erasing at least a portion of said solid state memory from said external processor.

10. The method of downloading data to an installed component on a printed circuit board during manufacturing according to claim 1, further comprising:
    appending information stored in said solid state memory from said external processor.

11. Apparatus for downloading data to an installed component on a printed circuit board during manufacturing, comprising:
    means for temporarily electrically coupling to an external processor during manufacturing a printed circuit board including an installed on-board processor and solid state installed memory;
    means for monitoring, from said external processor, operation of said on-board processor;
    means for activating a signal from said external processor to control operation said on-board processor; and
    means for downloading data from said external processor to adjust software in said solid state memory on said printed circuit board.

12. The apparatus for downloading data to an installed component on a printed circuit board during manufacturing according to claim 11, wherein :
    said signal is activated from said external processor based on a determination that said on-board processor has entered a passive state.

13. The apparatus for downloading data to an installed component on a printed circuit board during manufacturing according to claim 12, wherein:

said passive state of said on-board processor is an idle state.

14. The apparatus for downloading data to an installed component on a printed circuit board during manufacturing according to claim 12, further comprising:

means for holding said on-board processor in said passive state.

15. The apparatus for downloading data to an installed component on a printed circuit board during manufacturing according to claim 11, further comprising:

means for decoupling said external processor from said printed circuit board.

16. The apparatus for downloading data to an installed component on a printed circuit board during manufacturing according to claim 11, wherein:

said solid state memory is a Flash memory.

17. The apparatus for downloading data to an installed component on a printed circuit board during manufacturing according to claim 11, wherein:

said coupled signal is a reset signal.

18. The apparatus for downloading data to an installed component on a printed circuit board during manufacturing according to claim 11, a further comprising:

means for erasing at least a portion of said solid state memory from said external processor.

19. The apparatus for downloading data to an installed component on a printed circuit board during manufacturing according to claim 11, further comprising:

means for appending information stored in said solid state memory from said external processor.

20. A printed circuit board, comprising:

an on-board processor; and installed solid state memory;

wherein said on-board processor's operation is adapted to be responsive to an external processor during manufacturing to enable said external processor to adjust software in said installed solid state memory of said printed circuit board.

21. The printed circuit board according to claim 20, wherein:

said on-board processor allows said external processor to hold said on-board processor in a reset condition while said external processor adjust said software in said installed solid state memory.

\* \* \* \* \*